US009069069B2

(12) United States Patent  
Freund et al.

(10) Patent No.: US 9,069,069 B2
(45) Date of Patent: Jun. 30, 2015

(54) SYSTEMS, METHODS, AND APPARATUS FOR MARKING, VERIFYING, AND AUTHENTICATING CONSUMER PRODUCTS

(71) Applicant: The Standard Register Company, Dayton, OH (US)

(72) Inventors: Robert Freund, Centerville, OH (US); Steven McElwee, Dayton, OH (US); Daniel Thaxton, Dayton, OH (US)

(73) Assignee: The Standard Register Company, Dayton, OH (US)

( * ) Notice: Subject to any disclaimer, the term of this patent is extended or adjusted under 35 U.S.C. 154(b) by 61 days.

(21) Appl. No.: 13/836,766

(22) Filed: Mar. 15, 2013

(65) Prior Publication Data

US 2014/0122889 A1 May 1, 2014

Related U.S. Application Data

(60) Provisional application No. 61/720,129, filed on Oct. 30, 2012.

(51) Int. Cl.
| | |
|---|---|
| *G06F 21/00* | (2013.01) |
| *G01S 19/14* | (2010.01) |
| *G06F 21/30* | (2013.01) |
| *G06F 17/30* | (2006.01) |
| *G06Q 10/08* | (2012.01) |
| *G06K 19/06* | (2006.01) |

(52) U.S. Cl.
CPC ............... *G01S 19/14* (2013.01); *G06F 21/30* (2013.01); *G06F 17/30247* (2013.01); *G06K 19/06028* (2013.01); *G06Q 10/08* (2013.01)

(58) Field of Classification Search
CPC ............ H04L 9/0872; G06F 17/30247; G06F 17/30268; G06F 2221/2111; G06F 21/30; G06F 19/06028; G11B 20/0026; G06K 19/06028

USPC .......................................................... 713/176
See application file for complete search history.

(56) References Cited

U.S. PATENT DOCUMENTS

| | | | | |
|---|---|---|---|---|
| 7,283,630 | B1* | 10/2007 | Doljack | 380/55 |
| 7,770,783 | B2 | 8/2010 | Grant et al. | |
| 8,708,221 | B1* | 4/2014 | Sprague | 235/375 |
| 2006/0120607 | A1* | 6/2006 | Lev | 382/217 |
| 2008/0116256 | A1* | 5/2008 | Martin et al. | 235/375 |
| 2008/0256367 | A1* | 10/2008 | Grant | 713/189 |
| 2009/0212113 | A1* | 8/2009 | Chiu et al. | 235/462.41 |
| 2010/0282836 | A1* | 11/2010 | Kempf et al. | 235/375 |
| 2011/0068164 | A1* | 3/2011 | Hanson et al. | 235/375 |
| 2011/0176705 | A1* | 7/2011 | Kato | 382/100 |
| 2012/0127314 | A1* | 5/2012 | Clements | 348/150 |
| 2013/0132292 | A1* | 5/2013 | Lamb et al. | 705/318 |

OTHER PUBLICATIONS

Liu et al., "Digital Image Watermarking Spread-Space Spread-Spectrum Technique Based in Double Random Phase Encoding", 2013, pp. 162-177.*

* cited by examiner

*Primary Examiner* — Taghi Arani
*Assistant Examiner* — Thaddeus Plecha
(74) *Attorney, Agent, or Firm* — Dinsmore & Shohl LLP

(57) ABSTRACT

Methods for marking a consumer good at a distribution point are described that enable field authentication of the consumer good at an authentication point without connection to a remote database. Methods for authenticating a marked consumer good are described by scanning encrypted indicia without connecting to a remote database are described. Authentication methods for marked consumer goods, apparatus for carrying out the authentication methods, and systems based on the authentication methods are described.

16 Claims, 11 Drawing Sheets

SYSTEMS, METHODS, AND APPARATUS FOR MARKING, VERIFYING, AND AUTHENTICATING CONSUMER PRODUCTS

This application claims the benefit of priority under 35 U.S.C. §119(e) to U.S. Provisional Application Ser. No. 61/720,129, filed Oct. 30, 2012.

TECHNICAL FIELD

The present application relates generally to verification and authentication systems and, more particularly, to systems for verifying and authenticating consumer goods in a supply chain, to marked or labeled consumer goods employing encrypted indicia as part of a verification and authentication system, and to methods and apparatus involved in the verification and authentication systems.

BACKGROUND

The introduction of counterfeit merchandise into supply chains regularly results in major losses of revenue to legitimate manufacturers. Further losses of revenue are commonplace for consumer goods such as cigarettes, which typically are required to bear a tax stamp or other indicia proving that taxes have been properly paid. Similarly, knock-off versions of items ranging from purses and shoes to cases for cellular telephones have been known to diminish revenues to legitimate manufacturers of such items. Owing to ever more sophisticated technologies for counterfeiting legitimate brand indicia and/or simple tax stamps, enforcement against rouge distributors and retailers proves ever more difficult. As such, there are on-going needs for verification and authentication systems, and for methods of implementing such verification and authentication systems, that can efficiently and reliably assess the validity and/or authenticity of consumer goods, wherever they are found.

SUMMARY

Some embodiments are directed to methods for marking consumer goods at a distribution point. The methods may enable field authentication of the consumer goods at an authentication point without connection to a remote database. The methods may include generating a unique identifier for the consumer good; determining a permissible destination area for the consumer good; computing geographic coordinates of the permissible destination area; encrypting the unique identifier and the geographic coordinates into an encrypted data string; and marking the consumer good with encrypted indicia, the encrypted indicia comprising the encrypted data string.

Further embodiments described herein are directed to verification systems. The verification systems may include a consumer good marked with encrypted indicia. The encrypted indicia may include a unique serial number of the consumer good and geographic coordinates of a permissible destination area for the consumer good. The verification systems may also include a verification apparatus. The verification apparatus may include a processor; a scanner that reads the encrypted indicia and provides an encrypted data string to the processor; and a location device that communicates to the processor a geographic location of the verification apparatus at a verification time. In the verification system, the processor decrypts the encrypted data string to decrypted data and determines from the decrypted data whether the geographic location of the verification apparatus matches the geographic coordinates contained in the encrypted indicia.

Further embodiments described herein are directed to methods for authenticating a marked consumer good having an authentication surface marked with encrypted indicia. The encrypted indicia may include geographic coordinates of a permissible destination area for the consumer good. The methods may include verifying the encrypted indicia using a verification apparatus, the verification apparatus comprising a processor, a camera, and a location device that communicates to the processor a geographic location of the verification apparatus at a verification time. In particular, the verifying may include photographing with the camera at least an authentication portion of the marked consumer good to form an authentication image of the authentication portion that is sent to the processor, the authentication image containing the encrypted indicia. The verifying may also include decrypting the encrypted indicia contained in the authentication image with the processor to produced decrypted data and then comparing the geographic location of the verification apparatus at the verification time as determined by the location device with the geographic coordinates of the permissible destination area contained in the decrypted data. Then, the authenticity of the marked consumer good may be determined based on at least the comparison of the geographic location of the verification apparatus with the geographic coordinates of the permissible destination area.

Further embodiments described herein are directed to marked consumer goods. The marked consumer goods may include an outer packaging having a package marking on a package surface of the outer packaging, wherein the package marking includes encrypted package indicia that enable authentication of the marked consumer good by an authentication apparatus having a location device without requiring connection of the authentication apparatus to a remote database. The encrypted package indicia may include a unique serial number of the marked consumer good, a product identifier, and geographic coordinates of a permissible destination area for the marked consumer good. In some embodiments, the marked consumer goods may also include a marked article contained in the outer packaging. The marked article may have an article marking on an article surface of the marked article. The article marking may include encrypted article indicia. The encrypted article indicia may include the unique serial number, the product identifier, and a hyperlink to a manufacturer website that authenticates the marked consumer good from an image of the article marking.

Further embodiments described herein are directed to methods for providing consumer information to a retailer after purchase of a verified authentic marked consumer good by a customer. The methods may include packaging a marked article having an article marking on an article surface of the marked article in a marked package having a package marking on a package surface of the marked package. The package marking may include encrypted package indicia that enable authentication of the marked consumer good by an authentication apparatus having a location device without requiring connection of the authentication apparatus to a remote database. The encrypted package indicia may include a unique serial number of the marked consumer good, a product identifier, and geographic coordinates of a permissible destination area for the marked consumer good. The article marking may include encrypted article indicia. The encrypted article indicia may include the unique serial number, the product identifier, and a hyperlink to a manufacturer website that authenticates the marked consumer good from an image of the article marking. The methods may further include instructing the retailer to scan the package marking when the marked consumer good is sold to the customer and verifying authenticity of the marked consumer good after the retailer scans the package marking. The methods may further include instructing the retailer to upload the unique serial number from the scan of the package marking to a manufacturer database. The methods may further include instructing the customer to scan the article marking and be directed to the manufacturer website to enter registration data to the manufacturer database. Then, the unique serial number from the package marking obtained from the scan of the package marking by the retailer may be matched with the unique serial number from the article marking obtained from the scan of the article marking by the customer. The methods may further include providing the registration data to the retailer.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
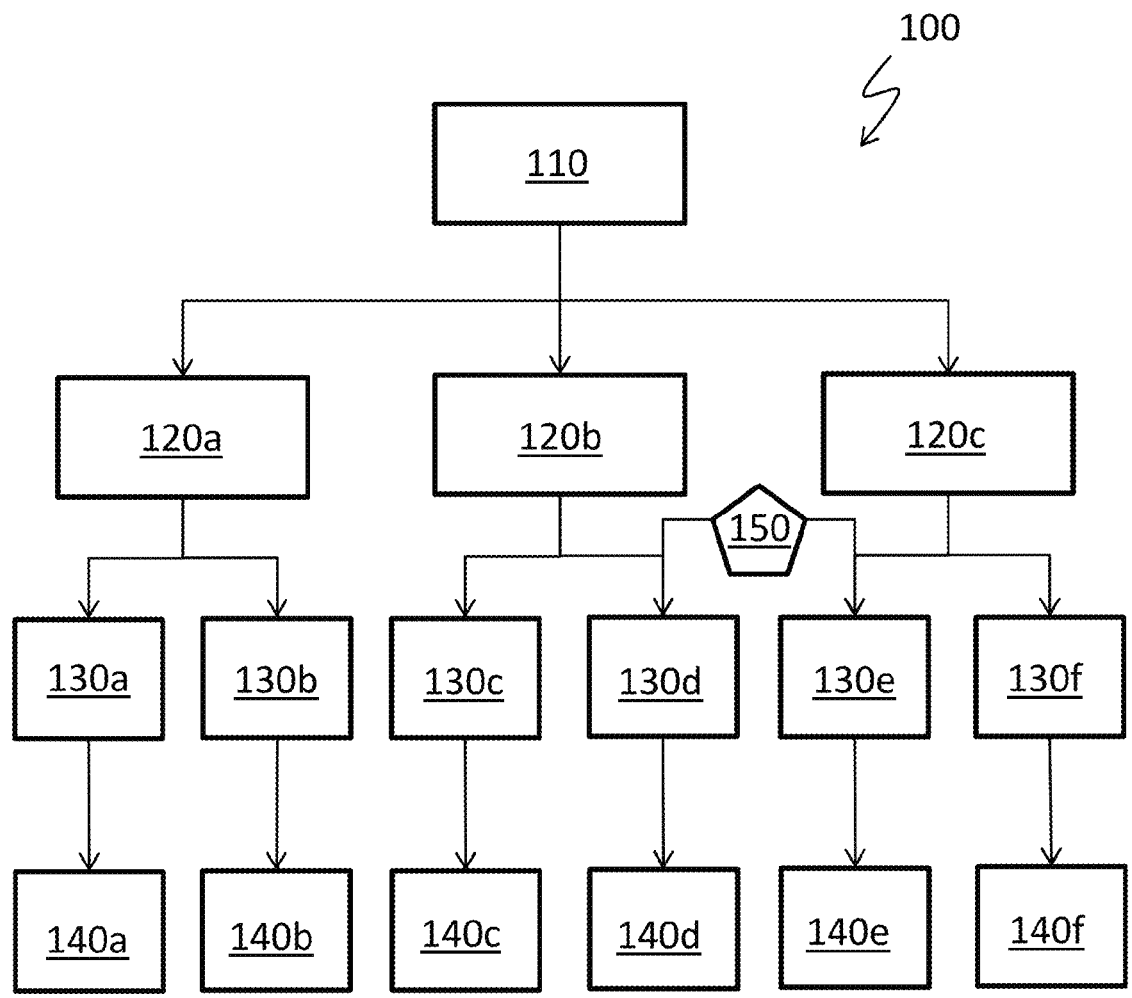
FIG. 1 is a flowchart representing a typical supply chain of a consumer good in commerce.

FIG. 1 is a generic representation of a supply chain 100 for a consumer good. Though the particular consumer good involved in the supply chain may ultimately determine the number of participants involved in any supply chain, or even the overall organization of the supply chain itself, it should be understood that FIG. 1 is intended to be illustrative only. As used herein, the term "consumer good" refers to any article of commerce that at the point of final sale to a consumer is customarily marked with brand indicia (such as registered or unregistered trademarks) and/or indicia representing payment of taxes applicable to the article of commerce. In general, the consumer goods described herein are those articles of commerce for which loss of profit, revenue, or taxation revenue would result when a counterfeit article or an otherwise legitimate article marked with counterfeit indicia is introduced into the supply chain of the article of commerce.

A consumer good may be produced by a manufacturer 110, for example. The manufacturer may produce the consumer good at one location or may assemble the consumer good from pieces obtained from one or more suppliers. Regardless, as used herein, the term "manufacturer" refers to the entity responsible for placing the consumer good in a substantially complete and substantially saleable condition.

The manufacturer 110 may ship or otherwise transport the consumer good to one or more distributors 120a-c. As used herein, the term "distributor" refers to the entity in the supply chain 100 directly responsible for providing the consumer good to the location from which it is intended to be sold to the public. Each of the one or more distributors 120a-c may be in charge of certain geographic area, for example. It should be understood that distribution of consumer goods may occur through multiple entities between the manufacturer 110 and the final places of sale (in which case only the entity closest to the final place of sale is a distributor, according to the definition), or may even occur directly from the manufacturer 110 to the final place of sale (in which case, the manufacturer 110 is also a distributor, according to the definition). In a special case involving consumer goods subject to national, state, or local taxation, through which indicia such as a tax stamp is to be applied to the consumer good as evidence of payment of a surcharge such as a sales tax, an excise tax, a value-added tax, a levy, or a tariff, for example, the entity having the customary responsibility to pay such surcharge and mark the consumer good accordingly shall be referred to herein as "tax-subject entities."

In turn, each of the distributors 120a-c may provide the consumer good to one or multiple retailers 130a-f. The retailers 130a-f then sell the consumer good to consumers 140a-f.

Each item sold by the retailers 130a-f may be said to have a "pedigree" based on the route the item has taken through the supply chain 100. For example, a consumer good purchased by individual customer 140c may have a pedigree including retailer 130c, distributor 120b, and manufacturer 110.

In the case of counterfeit consumer goods, however, entities that are not part of the legitimate supply chain may introduce the counterfeit goods somewhere between the manufacturer 110 and the consumers 140a-f. For example, a rogue distributor 150 may introduce counterfeit items into the supply chain 100 by selling the counterfeit items to retailers 130d and 130e at a significantly discounted cost. Though the consumers 140d and 140e who may purchase these goods may even be unaware that they possess counterfeits, inevitably the manufacturer 110 and potentially other participants in the supply chain 100 lose revenue.

The loss of revenue may become more complex when the consumer good is subject to a tax. For example, if the supply chain 100 were to represent a supply chain for cigarettes, customarily the distributors 120a-c would be tax-subject entities. The distributors 120a-c may even be located in separate jurisdictions, each subject to different taxation amounts. It is a known problem to cigarette taxation authorities worldwide that counterfeiters such as rogue distributor 150 can acquire otherwise legitimate goods, sometimes directly from the manufacturer 110, other times from illegitimate sources such as smugglers, then provide the otherwise legitimate goods to retailers such as retailers 130d and 130e. The retailers 130d and 130e may or may not even realize what has occurred. These otherwise legitimate goods may be marked with counterfeit indicia that falsely show proper payment of the appropriate tax. In a worse scenario, the retailers 130d and 130e may be very much aware of the operations of the rogue distributor 150. In one well-known fraud operation, a retailer 130d may purchase the untaxed goods from the rogue distributor 150 and return them to the distributor 120b for a credit on future merchandise. This credit represents not only the price of the consumer good alone, but of the consumer good plus applicable taxes evidenced on the counterfeit tax indicia. Then, the retailer 130d can use the credit to purchase legitimate goods having legitimate tax stamps, leaving the distributor 120b at a loss for the amount of tax stamp, and also leaving the national, state, and/or local taxation authority at a loss of taxation revenue.

In view of the above framework, embodiments described herein are directed to systems and methods for verifying and authenticating consumer goods, so as to solve problems such as loss of revenue to entities on the supply chain and to taxation authorities, and also to provide simple and reliable means for enforcement personnel to act on counterfeit consumer goods.

Figure 2A:
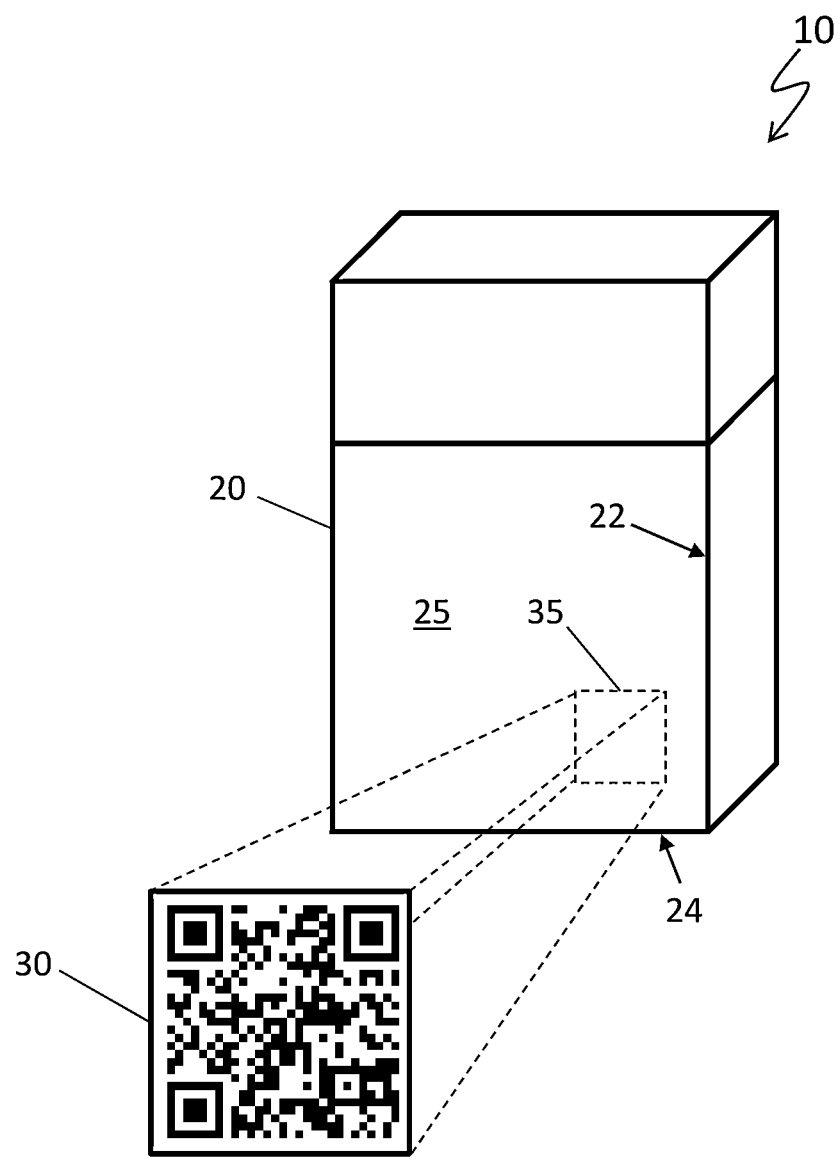
FIG. 2A shows a labeled consumer good according to embodiments described herein.
Figure 2B:
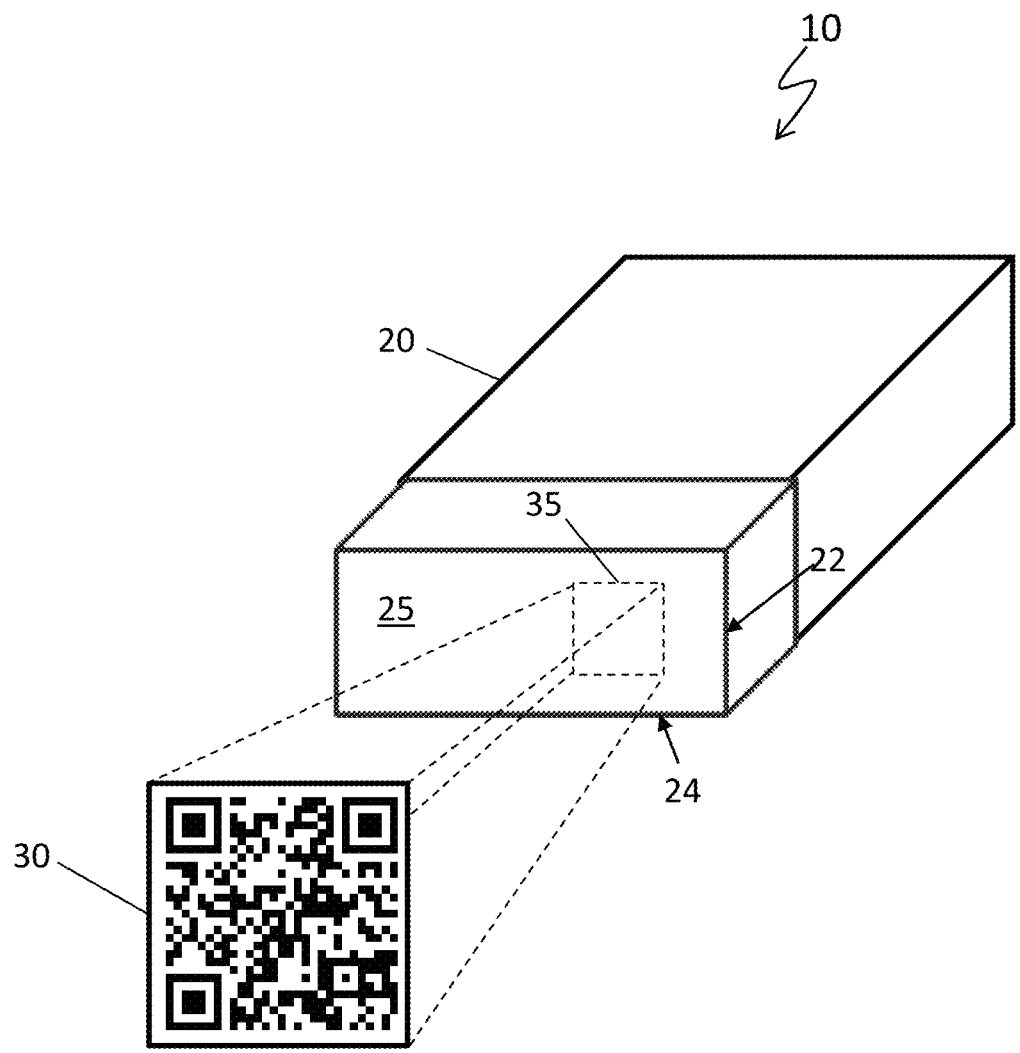
FIG. 2B shows a labeled consumer good according to embodiments described herein.

Referring to FIGS. 2A and 2B, in some embodiments, a marked consumer good 10 may include an outer packaging 20 having a package surface 25. Though FIGS. 2A and 2B show particular orientations of the outer packaging 20, it should be understood that these orientations are meant to be illustrative, not limiting. The package surface 25 may include edges such as a first edge 22 and a second edge 24. Though a rectangular box has been provided for illustrative purposes, it should be understood that packaging of any geometry, size, or configuration is contemplated, including rounded packaging that would lack any definable edges. The marked consumer good 10 may be marked with any suitable marking. In exemplary embodiments, the marked consumer good 10 may be marked with a package label 30 that is applied at a label position 35 on the package surface 25. In some embodiments, the package label 30 may be applied anywhere on the package surface 25.

In some embodiments, the package label 30 need not be a separate entity that is affixed or adhered to the package surface 25. Rather, the package label 30 may simply be indicia printed directly on the package surface 25, overtly or covertly. In other embodiments, the label position 35 may be selected very precisely, such that precise application of the package label 30 at the label position may be used as one indication of authenticity of the marked consumer good 10. Though not shown in FIGS. 2A and 2B, the package surface 25 may also include additional indicia such as artwork, solid colors, text, trademarks, logos, or other features unique to a specific brand of consumer good produced by the manufacturer. The additional indicia may be colored.

Figure 3A:
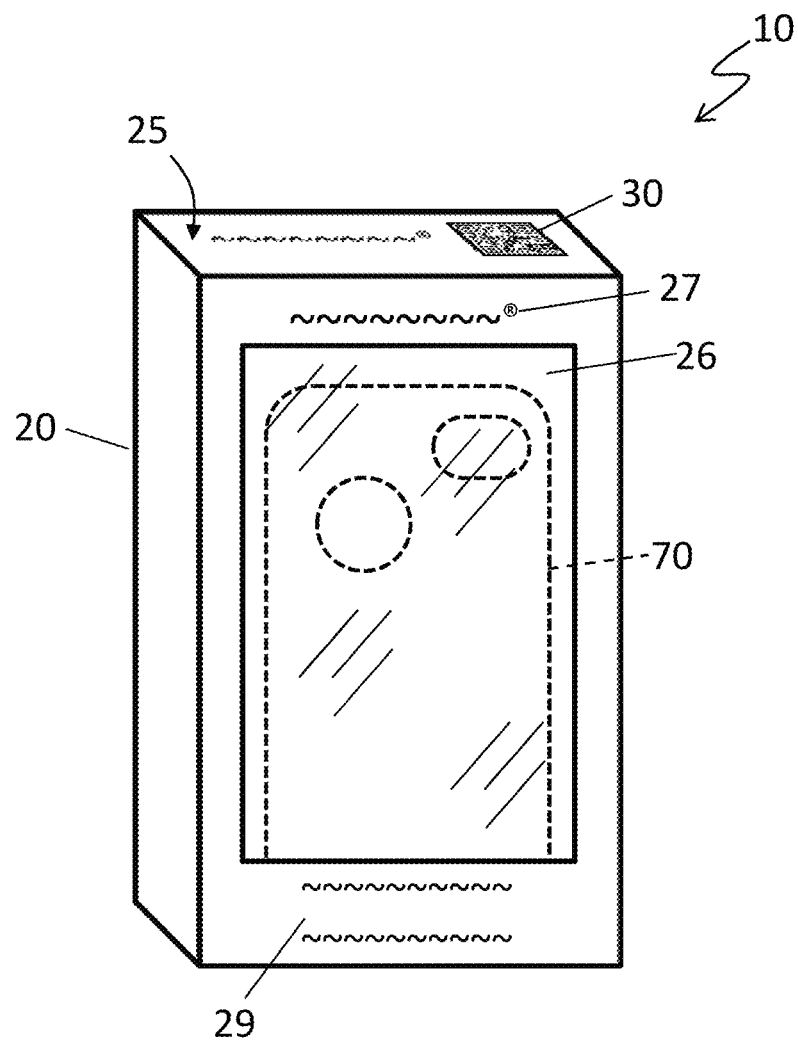
FIG. 3A shows a labeled consumer good including an outer packaging having a package label thereon and containing a labeled article, according to embodiments described herein.
Figure 3B:
FIG. 3B is a top view of the outer packaging of FIG. 3A including a package label on a surface of the packaging.
Figure 3C:
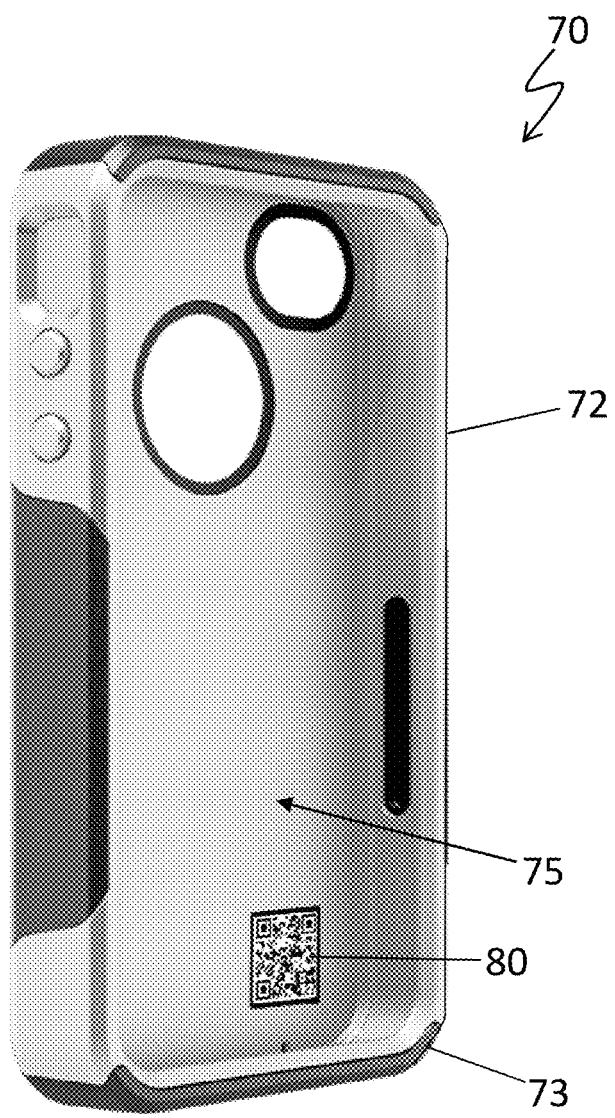
FIG. 3C is a perspective view of the labeled article contained in the outer packaging of the labeled consumer good of FIG. 3A.

Referring to FIGS. 3A-3C, an additional non-limiting embodiment of a marked consumer good 10 is provided. In some embodiments, of which FIGS. 3A-3C are exemplary, the marked consumer good 10 may include the outer packaging 20 with the package label 30 on the package surface 25 thereof, and the outer packaging 20 may be used as a container for a marked article 70 packaged inside an outer packaging 20. In the illustrative embodiment of FIG. 3A-3C, the marked article 70 is a protective case for a cellular telephone, known as an OtterBox®, available from Otter Products LLC. Though the OtterBox® is provided to illustrate the embodiment, it should be readily understood that the marked article 70 may be any type of article that can be marked or labeled, whether overtly or covertly. As shown in FIG. 3A, the marked consumer good 10 may include an outer packaging 20 having a package surface 25. A package label 30 may be affixed to the package surface 25 as described above and shown in detail in the top view FIG. 3B or may not be a separate entity but, rather, printed directly on the package surface 25. It should be understood that the package label 30 need not be on the top surface of the outer packaging 20 but may be placed on any surface in any convenient location. The outer packaging 20 may be decorated in any desirable manner and include indicia 29 such as text or logos, which may also include a brand name 27 that may indicate that the outer packaging 20 contains a trademarked brand, for example. The outer packaging 20 may also include features such as a window 26, which may be translucent or transparent to enable a consumer to view the contents of the outer packaging 20, such as the marked article 70 itself.

Referring specifically to FIG. 3C, the marked article 70 may include an article body 72 having an article surface 75 that may have a marking such as an article label 80 thereon. It should be understood that any type of marking may be used to mark the marked article 70 and that an article label 80 is simply one illustrative embodiment. When the marking is accomplished with a label, the article label 80 may be affixed to the article surface 75 by any suitable means such as an adhesive. In other embodiments, the article label 80 may be applied by a technology such as in-mold labeling during the manufacture of the marked article 70, such that the article label 80 is permanently molded to the marked article 70 without the use of an adhesive. In-mold labels and labeling processes and systems to form in-mold labeled articles have been described in U.S. Pat. Nos. 6,544,634; 7,166,249; 7,369,048; 7,806,158; 7,927,688; and 8,062,737, which are incorporated herein by reference in their entirety. Such in-mold labels may be permanent in the sense that they cannot be removed from the marked article 70 without noticeably damaging or even destroying the marked article 70. Particularly with regard to the embodiment of FIG. 3A, the article body 72 of the marked article 70 may be made of a plastic, a rubber, or a silicone. Such materials are especially amenable to the in-mold labeling processes used to form labeled articles with permanently bonded labels. Thus, in some embodiments, the article body 72 of the marked article 70 may be made of any material to which an in-mold label may be applied during an injection molding process or related molding process, and the article label 80 may be a material suitable for in-mold labeling. Examples of materials suitable for in-mold labeling include microporous silica-filled polymer sheets such as Teslin®, available from PPG Industries.

In some embodiments, the package label 30, contains encrypted indicia that encode information material to a determination of whether the marked consumer good 10 is authentic. In some embodiments, the encrypted indicia may be overtly visible to the naked eye, such as in the package label 30 of FIGS. 2A, 2B, and 3A. In other embodiments, the encrypted indicia may be covert and invisible to the naked eye, such as by being printed in an invisible ink that fluoresces under UV or IR light. In the embodiments of FIGS. 2A, 2B, and 3A, the encrypted indicia are contained in a two-dimensional bar code format commonly known as a Quick Response code (QR-code). Nevertheless, it should be understood that the encrypted indicia may be provided in any other practical form, provided the other practical form is capable of storing a sufficient amount of information needed to contain the authenticating information being used. Because QR-codes and other known encoding forms may be readily readable by devices available to the public, in should be understood that mere encoding of data for placement on the label does not by itself constitute "encryption." Thus, in some embodiments the encrypted indicia of the package label 30 may be provided on the package label 30 through an encryption algorithm, such that when a person attempts to read the encrypted data from the package label 30 using a commonly available reader alone, the user decodes only a gibberish string of alphanumeric characters, for example. In other embodiments, the encrypted indicia may be layered, allowing part of the encrypted data to be read by commonly available code readers and other parts of the encrypted data to remain hidden until scanned with a reader specially equipped to decode the hidden data. In such embodiments, the hidden parts of the encrypted data may be readable only by a scanner that can read information printed in a normally invisible ink that is made visible only by exposure to infrared or ultraviolet radiation, for example.

In some embodiments, the encrypted indicia on the package label 30 may be derived from at least one unique identifier and at least one authenticating piece of information. In other embodiments, the encrypted indicia on the package label 30 may be derived from at least one unique identifier and at least two authenticating pieces of information. Non-limiting examples of unique identifiers and authenticating pieces of information applicable to one or more embodiments herein will now be described.

In some embodiments, the encrypted indicia on the label may include a unique serial number as a unique identifier. The unique serial number may be generated by the manufacturer or by a distributor, for example. The unique serial number may include a sufficient number of alphanumeric characters to avoid repetition of a serial number over a period of time such as 10 years or even 100 years. For example, the unique serial number may include 8, 10, 15, 20, or more than 20 alphanumeric characters. Consistent with the definition of "unique," each marked consumer good 10 may have a unique serial number that does not match with the unique serial number affixed to any other labeled consumer good. The unique serial number may include information as to the manufacturer, any intended distributors, date of manufacture, and date of shipping, for example.

In some embodiments, the particular consumer good may customarily be sold in bulk lots, in which one or more individual items is combined for sale at the consumer, retailer, or distributor level. In such embodiments, the encrypted indicia on the package label 30 may further include bulk information as a unique identifier. For example, cigarettes are customarily sold to consumers in packs of 20 cigarettes or in cartons of 10 packs. At the distributor level, cigarettes may be sold as cartons, in master cases of 50 cartons (10,000 cigarettes), or in pallets of 50 master cases (containing 2500 cartons, or 500,000 cigarettes). The pallets or master cases may be broken up to fulfill smaller orders by distributors or retailers. Thus, the bulk information as a unique identifier on the package label 30 of the marked consumer good 10 (for example, a pack of cigarettes) may link the pack of cigarettes to the carton from which it came, to the master case from which the carton came, and to the pallet from which the master case came. Thereby, the bulk information can be used to detect the origin of counterfeit or improperly taxed cigarettes and, particularly, where in the supply chain the counterfeit or improperly taxed cigarettes are entering the stream of commerce. Likewise, manufactured products such as cellular phone protectors may be manufactured, sold, and/or distributed according to a lot scheme similar to that of cigarettes. In such an example, the package label 30 can be used to track and trace the origin of a particular manufactured good and may additionally be used to identify lot numbers in common to defective parts. Thereby, in one example embodiment, the information on the package label 30 can be used to trace a source of a manufacturing defect down to a particular molding cavity of a particular molding apparatus.

In some embodiments, the encrypted indicia on the package label 30 may include a tax serial number as a unique identifier. The tax serial number may be generated when the appropriate tax is paid for the consumer good, including but not limited to cigarettes. The tax serial number may further include information as to the jurisdiction or jurisdictions to which the tax was paid, the amount of tax paid, and the date on which the tax was paid. At minimum, however, the tax serial number will be connected to a single tax-payment transaction that can be tracked and traced using other encrypted indicia on the package label 30 as being both legitimate and connected to the uniquely identified consumer good.

As noted above, in addition to the one or more unique identifiers that may be contained within the encrypted indicia, the encrypted indicia may also include at least one or at least two authenticating pieces of information. In some embodiments, the encrypted indicia may contain precise geographic coordinates of a valid retail location. The precise geographic coordinates may include a latitude and a longitude of a valid retail location, both being provided with enough specificity to geographically distinguish the valid retail location from a building next door to the valid retail location. The valid retail location may be determined, for example, by the distributor on receipt and acceptance of an order from a retailer. If the retailer is a retailer with which the distributor commonly does business, the distributor may know in advance the precise geographic coordinates of the retailer's location. Further uses for the precise geographic coordinates as an authenticating piece of information will become apparent below in the context of verification systems, methods, and devices.

In some embodiments, the encrypted indicia may contain a product identifier as an authenticating piece of information. The product identifier may include information that describes the type of product onto which the package label 30 is applied.

The product identifier may be an alphanumeric code linkable to a database of product types such as "pack of 20 cigarettes of Brand X" or "Brand Y sporting good" or "Brand Z fashion item." Further uses for the product identifier as an authenticating piece of information will become apparent below in the context of verification systems, methods, and devices. In some embodiments, the product identifier may be linked to a reference image stored in the database. Thus, when the product identifier is linked to a particular product, of which a verification image has been photographed during a verification method according to embodiments herein, the verification image may be compared with the reference image as an additional layer of authentication. Without intent to be bound by theory, it is believed that if encrypted indicia are present on a consumer good that not only looks the way the consumer good is expected to look (based on comparison of the authentication image and the reference image), but also is found to geographically located where it is supposed to be located (based on comparison of actual location with encoded geographic coordinates such as GPS coordinates), the likelihood of authenticity of the consumer good may be significantly increased.

When the unique identifiers and all authenticating pieces of information are known, they may all be combined as a data string in any practical manner. The data string may further contain obfuscating characters to hamper attempts to decode the information. Thereupon, the data string may be encrypted using a known or proprietary encryption algorithm to form an encrypted data string. The encrypted data string may be encoded into a suitable form such as a QR-code, for example, and then printed onto the package label 30. The package label 30 may be affixed permanently to the marked consumer good 10 with an adhesive, for example. The package label 30 may also include features that prevent defacing of the package label 30. The label may also include features such as score marks that prevent a person from removing the package label 30 from the marked consumer good 10 without destroying the package label 30 or rendering it illegible.

In embodiments in which the marked consumer good 10 includes a marked article 70 inside an outer packaging 20, as shown in FIGS. 3A-3C, the package label 30 and the article label 80 may be used for different purposes or cooperatively as part of an authentication system. For example, the package label 30 may include encrypted indicia encoding one or more pieces of information described above, such as a unique identifier for the consumer good that uniquely identifies the good enclosed in the outer packaging 20, geographic coordinates of a permissible destination area or sales territory for the consumer good, a product identifier code that identifies the type of consumer good enclosed in the outer packaging 20, or any combination thereof. In some embodiments, the package label 30 may also include a hyperlink encoded in the encrypted indicia, such that when a consumer in a retail store scans the package label 30 with a smart phone, for example, a web browser on the smart phone may be directed to a product page at the manufacturer's website. The product page may include additional information about the product or may offer discounts for purchasing the product. The discounts may be determined by other information such as the geographic coordinates on the package label 30 or the geographic location of the retail store in which the consumer scans the package label 30. The product page may also be equipped to process other encrypted indicia on the package label 30 such as a unique identifier or a product identifier, whereby the product page may indicate to the consumer whether or not the marked consumer good 10 is in fact a genuine or authentic article from the manufacturer. Particularly when the marked consumer good 10 is sold from a street vendor or other unusual retail location, such easy availability of authenticating information may prove invaluable to the consumer who does not desire to purchase counterfeit or knock-off merchandise. Likewise, the ability to scan and authenticate may be useful to law enforcement or to investigators from the manufacturer itself, either of whom may desired to know whether a particular piece of merchandise may be counterfeit.

The article label 80 on the marked article 70 may include encrypted indicia encoding similar information to the package label 30. The article label 80 may afford additional benefits in combination with the package label 30, under the assumption that the article label 80 generally will be scanned only after the marked consumer good 10 is purchased and the marked article 70 is removed from the outer packaging 20. In some embodiments, the article label 80 may further include encrypted indicia encoding encrypted indicia encoding one or more pieces of information described above, such as a unique identifier for the consumer good that uniquely identifies the good enclosed in the outer packaging 20, a product identifier code that identifies the type of consumer good enclosed in the outer packaging 20, a hyperlink to a product page, or any combination thereof. Though geographic coordinates relating to the marked article 70 may be of less interest to law enforcement than geographic coordinates related to the outer packaging 20, the geographic coordinates may also be encoded in the encrypted indicia of the article label 80. In some embodiments, the article label 80 may include encrypted indicia encoding a hyperlink to a registration page at the manufacturer's website, such that when the consumer scans the article label 80 with a smart phone, the consumer may be prompted to register the product. Thereby, the manufacturer can develop a customer database and potentially send directed advertisements to its known customers. The customer may be further encouraged to register through an offer to win a prize, receive a coupon, or even play a game after the registration is complete.

As noted above, the package label 30 may be used cooperatively as part of an authentication system with the article label 80. For example, both the package label 30 and the article label 80 may contain encrypted indicia encoding the same unique identifier for both the outer packaging 20 and the marked article 70. The retailer selling the marked consumer good 10 may be instructed by the manufacturer or distributor, for example, to routinely scan the package label 30 when the marked consumer good 10 is purchased. Information from the encrypted indicia on the package label 30 may then be uploaded to the manufacturer by any suitable means, such as wirelessly through the internet, and optionally information of an authentic good can be returned to the retailer after the routine scan. Then, when the consumer opens the outer packaging 20, the consumer may be instructed or otherwise encouraged to scan the article label 80 to be directed to register a new purchase. During the act of uploading registration data during the registration process, the unique identifier encoded in the article label 80 that the consumer has scanner will pair the marked article 70 with unique identifier scanned by the retailer and, thereby, will connect the consumer's registration data to the location of the purchase transaction from the retailer. The manufacturer may then provide the registration information back to the retailer, for example, such that the retailer could maintain a customer database of people who have previously purchased particular products.

In the illustrative embodiment of the cellular telephone protector case of FIGS. 3A-3C, information about a customer's purchase of a case either with or for a particular type of cellular telephone may be valuable not only to sellers of protector cases but also to sellers of the cellular telephones themselves. For example, knowing a person owns a protective case for Brand X cellular telephone, it may be inferred that the person also owns a Brand X cellular telephone and potentially would be interested in receiving information on deals for upgraded models at the retail outlet that sold the protective case. Or in reverse, knowing a person owns a protective case for the Brand X cellular telephone, it may be inferred that the person not only owns a Brand X cellular telephone but also may be most likely to choose a Brand Y cellular telephone when a new model or upgrade becomes available. As such, when the Brand Y cellular telephone is finally introduced or expected to be introduced, the manufacturer or retailer of the protective case can inform the consumer of the availability of new cases made especially for the Brand Y cellular telephones. Thus, the combination of the package label 30 and the article label 80 may be used as a marketing device in addition to a security and authentication device.

The marked consumer good 10 described above, which are marked with a package label 30 containing encrypted indicia including at least one unique identifier and at least one authenticating piece of information, may be parts of systems and methods for verifying and authenticating the marked consumer good 10. Embodiments of such systems and methods now will be described.

Figure 4:
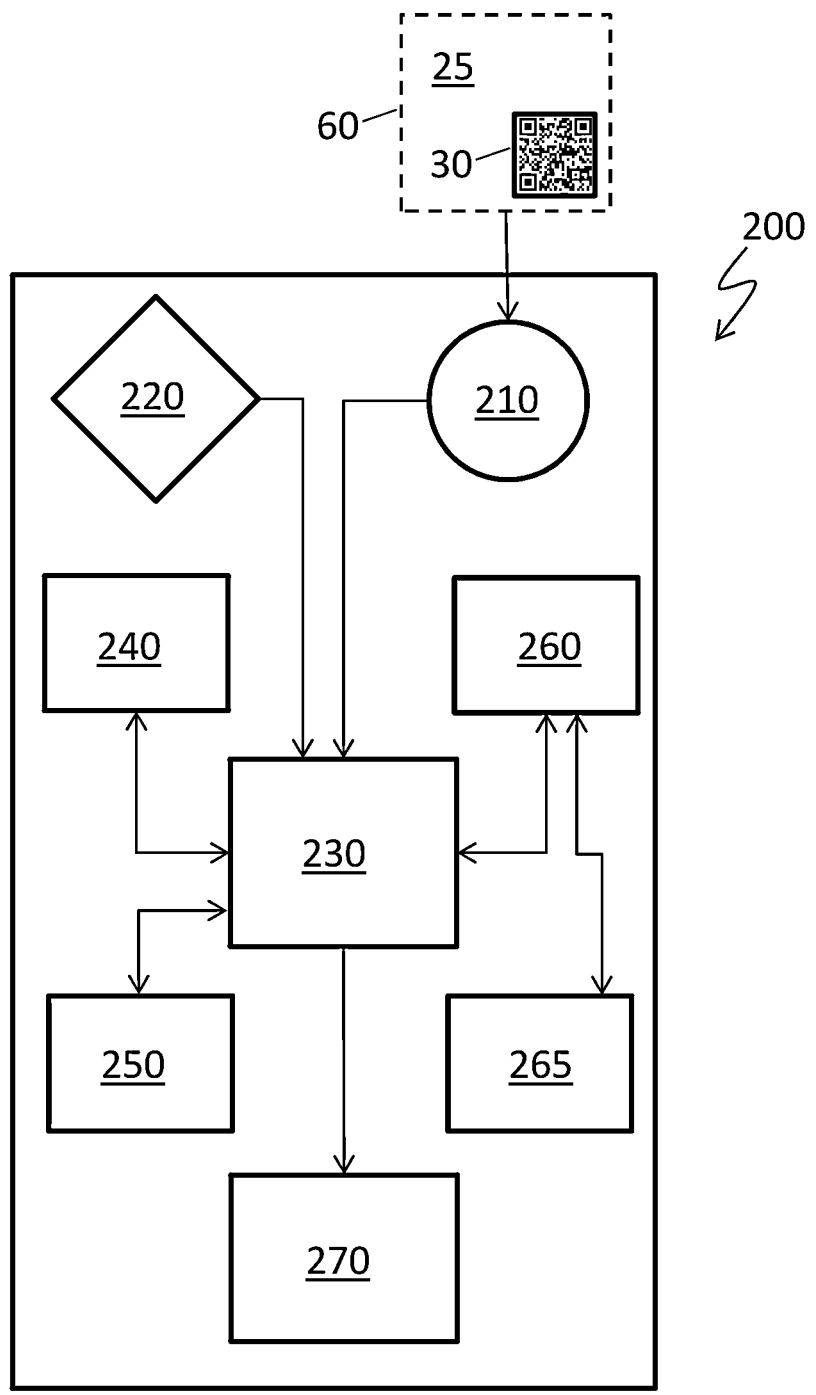
FIG. 4 is a schematic diagram of an authentication apparatus used in embodiments of verification and authentication systems and methods described herein.

In some embodiments, systems and methods for verifying and authenticating labeled consumer goods may include an authentication apparatus 200 as schematically shown in FIG. 4. The authentication apparatus 200 may include a scanner that is capable of reading encrypted indicia. In some embodiments, the scanner is a camera 210 that may be in communication with an application or program that locates and un-encodes or decrypts information from a photographic image. The authentication apparatus 200 may also include a location device 220 capable of determining the location of the authentication apparatus (e.g., a GPS receiver). The camera 210 and the location device 220 may be communicatively coupled with a processor 230. The processor 230 may be coupled also with a decoder 240, a display 270, and optionally with one or more of a serial number database 250 and a product code database 260. When present, the product code database 260 may also be coupled with a product image database 265. In preferred embodiments, all components of the authentication apparatus 200 are contained in a single hand-held device, such as a smart phone or a mobile computer.

The camera 210 may be any photographic device having sufficient resolution to capture all of the encrypted indicia contained on the package label 30 of the marked consumer good 10 and feed an image of the encrypted indicia to the processor 230 for decoding by the decoder 240.

The location device 220 may be any device capable of determining the geographic location of the authentication apparatus 200 at any given time at least to the precision of encoded geographic location information of the valid retailer contained on the package label 30 as a piece of authenticating information. In some embodiments, the location device 220 may be a GPS receiver. GPS technology in general is well known and uses triangulations from multiple satellites in stationary orbits to determine locations. When the location device 220 is a GPS receiver, it may be capable of translating information from the satellites into a longitude and a latitude, for example, which can be compared with geographic information contained in encrypted indicia on marked consumer goods. In other embodiments, the location device 220 may be any device that uses locating means other than GPS technology to pinpoint its own location. For example, the location device 220 may use triangulations from cell-phone towers or may utilize on-line wireless router information to determine a geographic location. It is contemplated that numerous technologies for location devices have yet to be developed. Thus, the location device 220 is not intended to be limited solely to devices that use GPS technology, but rather to all known or to-be-invented devices that can pinpoint their own location with sufficiently reasonable accuracy to be useful in an authentication method for consumer goods.

The processor 230 may be any computer device capable of manipulating data from the camera 210, the location device 220 (e.g., a GPS receiver), and comparing the data with data stored in databases such as the serial number database 250, the product code database 260, and the product image database 265.

The display 270 may be any suitable device capable of displaying textual or graphic messages. In some embodiments, the display 270 is a display of a smart phone or a mobile computer. In other embodiment, the display 270 is a monitor screen that may be detached from the authentication apparatus 200.

The decoder 240 may be any suitable device, algorithm, or computer application that can receive information from the processor 230 and convert the information first into an encrypted data string then, after applying a decryption algorithm, can transform the encrypted data string into a decrypted data string, parse the decrypted data string into discrete data elements, and return the discrete data elements back to the processor. The discrete data elements may include the unique identifiers and the authenticating pieces of information that were encrypted and encoded onto the package label 30 when the package label 30 was created.

The serial number database 250 is optional and, when present, may contain a list of valid serial numbers of the marked consumer good 10. In some embodiments, the list of valid serial numbers may be exhaustive, in that all valid serial numbers that have been issued for the particular consumer good are contained in the serial number database 250. In other embodiments, the serial number database 250 may contain a list of only the valid serial numbers of consumer goods expected to be present at a particular location where the authentication apparatus 200 is expected to be used. In some embodiments, authenticity of the marked consumer good 10 may be additionally based on at least the verification that the unique serial number matches a serial number on the list contained in the product database.

The product code database 260 is optional and, when present, may contain a complete list of product identifiers associated with brief product descriptions such as brand names and textual information about how a consumer good marked with a particular product identifier should appear to a person using the authentication apparatus 200 to authenticate the consumer good.

When the product code database 260 is present, the product code database 260 may be further linked to a product image database 265. The product image database 265 may contain one or more reference images of all or a portion of a package surface 25 of a known authentic consumer good of the type identified by the product identifier. The one or more images may be taken from an authentication area 50 of the package surface 25. In some embodiments, the reference images may contain all data that would be necessary to display the reference images on a display screen, for example. In other embodiments, the reference images may include only image definitions such as histograms or color ratios that are critical for authenticating an authentication image by comparison with the reference image. Additional details of the product image database 265 and the authentication area 50 will now be described with reference to illustrative embodiments shown schematically in FIGS. 5 and 6.

Figure 5:
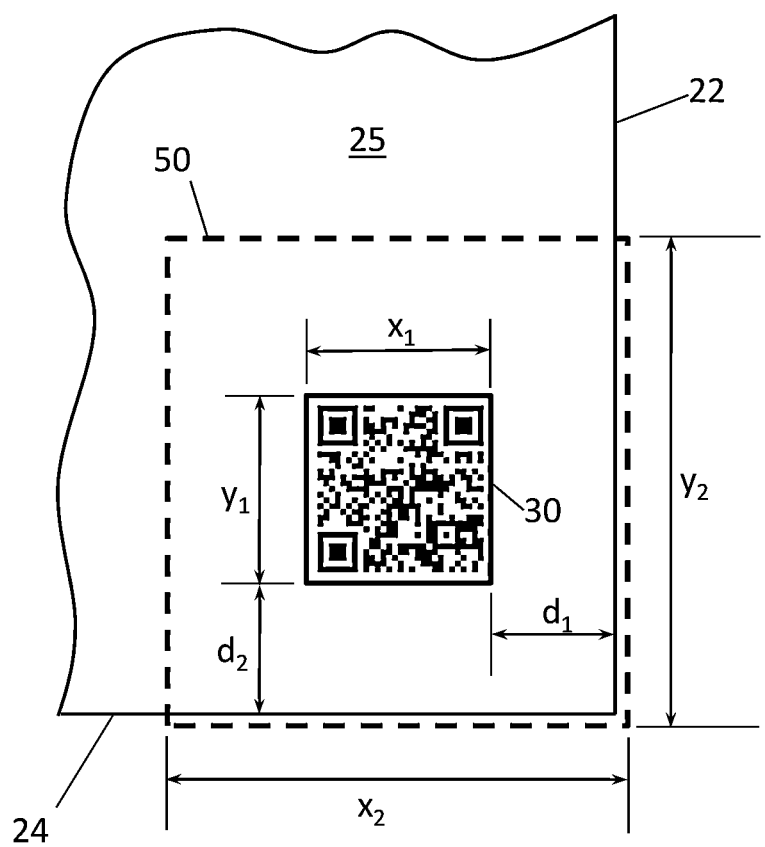
FIG. 5 illustrates a verification area of an image that may be present in a product image database of an authentication apparatus according to embodiments described herein.

In FIG. 5, a portion of a package surface 25 of a labeled consumer good is shown. The portion of the packaging surface includes the package label 30. The authentication area 50 of the package surface 25 also includes the package label 30. In general, the product image database 265 contains a photographic reference image of the authentication area 50. The package label 30 has a known width $x_1$ and a known height $y_1$. In some embodiments, the package label 30 also has a known distance $d_1$ from the first edge 22 of the package surface 25 and a known distance $d_2$ from the second edge 24 of the package surface 25. Thus, the width $x_2$ and the length $y_2$ of the authentication area 50 can be computed easily as a proportion of the known width $x_1$ and the known length $y_1$ of the package label 30. The availability of such a simple computation may allow capture of images for the product image database 265 without a need to standardize photographic parameters such as focal length, distance from the package surface 25, or surface area captured in the image of the authentication area 50.

Figure 6:
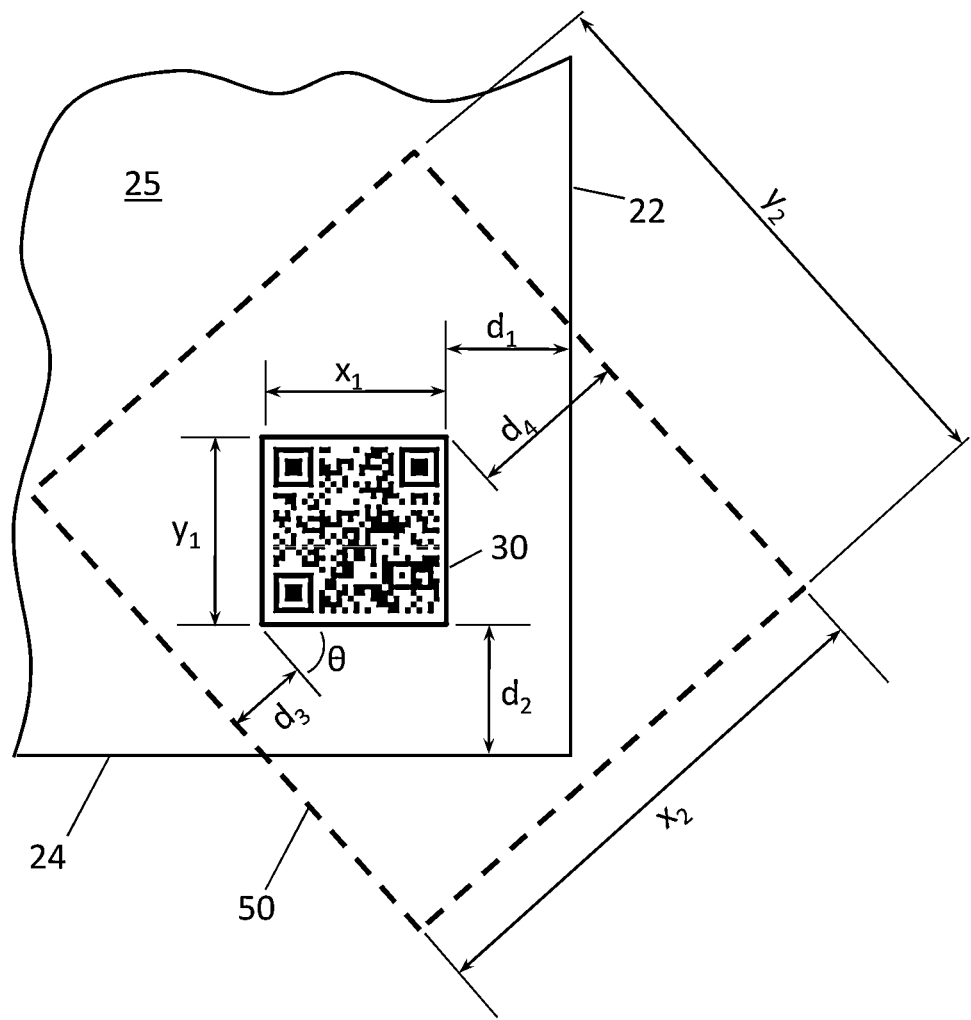
FIG. 6 illustrates an angled verification area of an image that may be present in a product image database of an authentication apparatus according to embodiments described herein.

In FIG. 6, an alternative embodiment of an authentication area 50 is provided, in which the authentication area 50 is rotated by an angle θ relative to the package label 30. As in the embodiment of FIG. 5, the package label 30 has a known width $x_1$ and a known height $y_1$. In some embodiments, the package label 30 also has a known distance $d_1$ from the first edge 22 of the package surface 25 and a known distance $d_2$ from the second edge 24 of the package surface 25. Thus, the width $x_2$ and the length $y_2$ of the authentication area 50 can be computed easily as a proportion of the known width $x_1$ and the known length $y_1$ of the package label 30. Additionally, distances $d_3$ and $d_4$ of the label to the boundaries of the authentication area 50 may be computed as a simple proportion of the known width $x_1$ and the known length $y_1$ of the package label 30.

Having described the various components of the authentication apparatus 200, embodiments of verification methods now will be described. Embodiments of verification methods using the authentication apparatus 200 described above may be particularly advantageous, because all information necessary for verifying and authenticating the labeled consumer goods is contained on the authentication apparatus 200 itself. Thus, the user of the authentication apparatus 200 is not required to establish any communication with a database in a different location, thereby providing both convenience and security to the authentication process.

In some embodiments, methods for authentication of a labeled consumer good may include photographing a capture area 60 of a package surface 25 of the marked consumer good 10 at an authentication time. The capture area 60 may contain the encrypted indicia, such as the encrypted indicia on the package label 30, for example, and may also contain areas of the package surface 25 beyond the package label 30. The camera 210 may send image information to the processor 230, and the processor 230 may use the decoder 240 to decode and decrypt the image information into discrete data elements. In some embodiments, the discrete data elements may include precise geographic coordinates of a valid retail location. When the precise geographic coordinates are identified in the discrete data elements, the processor 230 then may query the location device 220 (e.g., a GPS receiver) to determine the location of the authentication apparatus 200 at the authentication time. If the geographic coordinates of from the encrypted indicia match the location of the authentication apparatus 200 received by the processor 230 from the location device 220, the processor may indicate on the display 270 that the labeled consumer good is authentic, such as by displaying a text message or a colored indicator. On the other hand, if the geographic coordinates of from the encrypted indicia do not match the location of the authentication apparatus 200 received by the processor 230 from the location device 220, the processor may indicate on the display 270 that the labeled consumer good is potentially counterfeit, such as by displaying a text message or a colored indicator, whereupon the user of the authentication apparatus 200 may proceed with additional confirmations or may take legal steps to seize allegedly counterfeit goods.

In other embodiments, the methods for authentication of a labeled consumer good may include photographing a capture area 60 of a package surface 25 of the marked consumer good 10 at an authentication time. The capture area 60 contains the encrypted indicia, such as the encrypted indicia on the package label 30, for example, and may also contain areas of the package surface 25 beyond the package label 30. The camera 210 may send image information to the processor 230, and the processor 230 may use the decoder 240 to decode and decrypt the image information into discrete data elements. When the discrete data elements include a unique serial number and the authentication apparatus 200 includes a serial number database 250, the processor 230 may query the serial number database 250 to determine whether the unique serial number from the encrypted indicia is valid. If the serial number database 250 contains only serial numbers that should be present at a particular location, the unique serial number from the encrypted indicia may not match any serial number in the serial number database 250, even if the unique serial number from the encrypted indicia is objectively valid, when the labeled consumer good happens to be present at an unexpected location. If the unique serial number from the encrypted indicia matches a serial number from the serial number database 250, the processor 230 may display an appropriate message on the display 270 indicating authenticity of the consumer good. On the other hand, if the unique serial number from the encrypted indicia does not match a serial number from the serial number database 250, the processor 230 may display an appropriate message on the display 270 indicating that the consumer good may be counterfeit, whereupon the user of the authentication apparatus 200 may proceed with additional confirmations or may take legal steps to seize allegedly counterfeit goods.

In other embodiments, the methods for authentication of a labeled consumer good may include photographing a capture area 60 of a package surface 25 of the marked consumer good 10 at an authentication time. The capture area 60 contains the encrypted indicia contained on the package label 30 and may also contain areas of the package surface 25 beyond the package label 30. The camera 210 may send image information to the processor 230, and the processor 230 may use the decoder 240 to decode and decrypt the image information into discrete data elements. When the discrete data elements include a product identifier, the processor may query the product code database 260 and subsequently display the information in the product code database 260 linked to the product identifier found in the encrypted indicia. The user of the authentication apparatus 200 may then decide whether the information displayed on the display 270 are consistent with the actual look and feel of the marked consumer good 10. If the information is found to be consistent, the user may decide that the marked consumer good 10 is authentic. On the other hand, if the information is found to be inconsistent, the user of the authentication apparatus 200 may proceed with additional confirmations or may take legal steps to seize allegedly counterfeit goods.

In other embodiments, the methods for authentication of a labeled consumer good may include photographing a capture area 60 of a package surface 25 of the marked consumer good 10 at an authentication time. The capture area 60 contains at least the encrypted indicia contained on the package label 30 and may also contain areas of the package surface 25 beyond the package label 30. The camera 210 may send image information to the processor 230, and the processor 230 may use the decoder 240 to decode and decrypt the image information into discrete data elements. When the discrete data elements include a product identifier and a product image database 265 is also present, the processor may query the product code database 260, and the product code database 260 may return an image of the authentication area 50 to the processor 230. Determination of the authenticity of the marked consumer good 10 from when the processor 230 contains image data from both authentication area 50 and the capture area 60 will be illustrated now with reference to FIGS. 7-12.

The illustrations of FIGS. 7-12 each include the package surface 25, the package label 30, authentication area 50, and the capture area 60. As described above, an image of the authentication area 50 is contained in the product image database 265. The product image database 265 may have been constructed at any suitable time by photographing labeled consumer goods known to be authentic. The photography involved with producing an image of the capture area 60, however, is entirely user-dependent. The user of the authentication apparatus 200 may quickly photograph the marked consumer good 10 at a distance and angle that is difficult or impossible to control or keep reliably constant without the need for additional hardware such as a tripod or a light meter. Nevertheless, authentication methods herein do not require any particular level of accuracy or precision on the part of the user of the authentication apparatus 200, except that the user be able to include at least the entirety of the package label 30 in the capture area 60 so that the encrypted indicia thereon may be read, decoded, and unencrypted.

Figure 7:
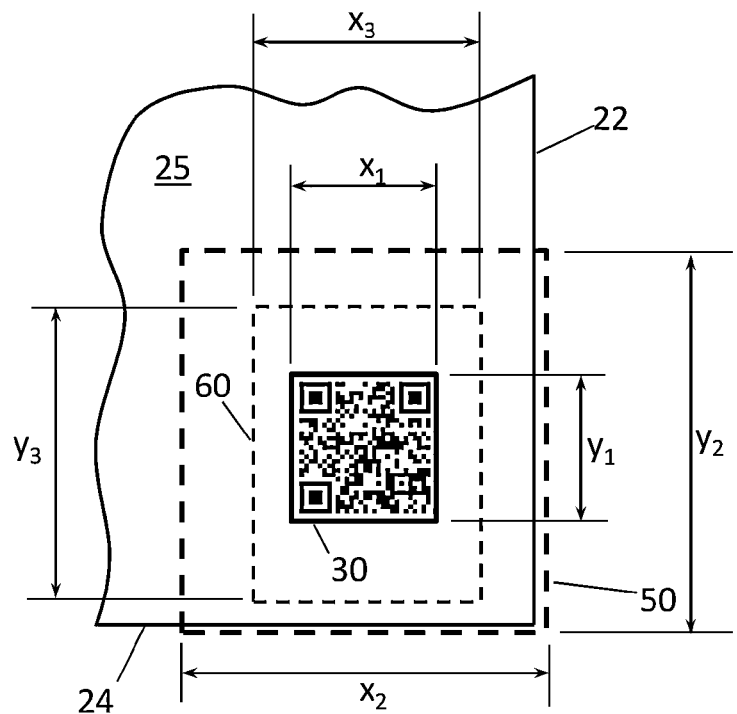
FIG. 7 illustrates a capture area and a verification area of a labeled consumer good, as applicable to embodiments of verification and authentication methods described herein.
Figure 8:
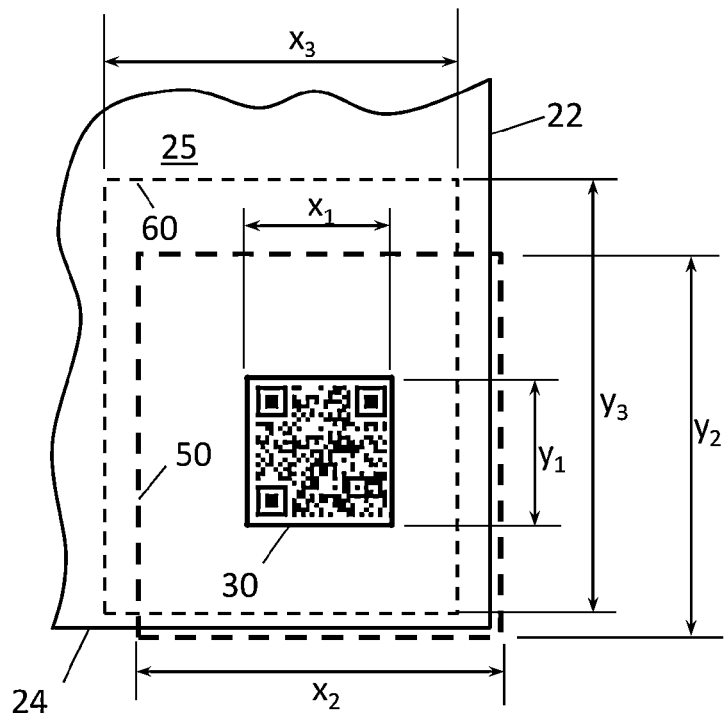
FIG. 8 illustrates an additional configuration of a capture area and a verification area of a labeled consumer good, as applicable to embodiments of verification and authentication methods described herein.
Figure 9:
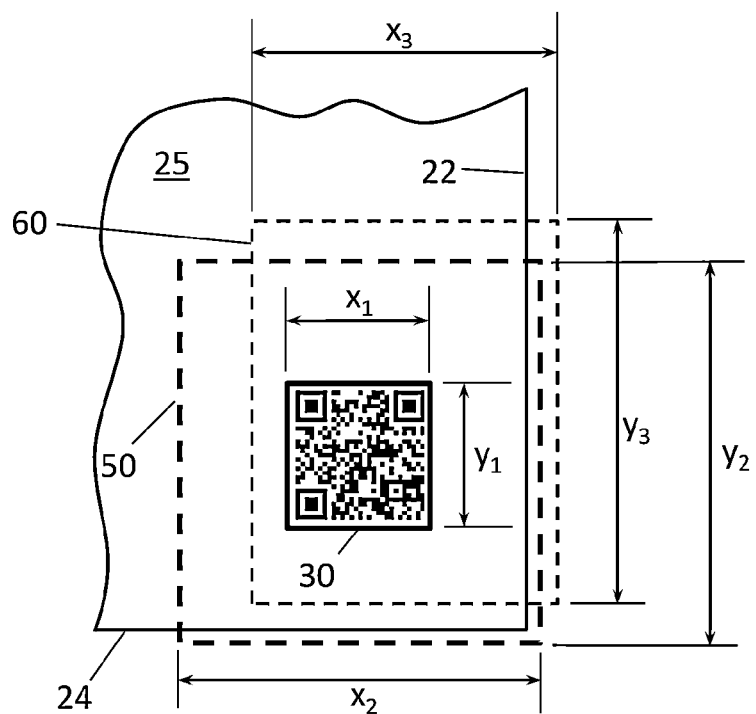
FIG. 9 illustrates an additional configuration of a capture area and a verification area of a labeled consumer good, as applicable to embodiments of verification and authentication methods described herein.
Figure 10:
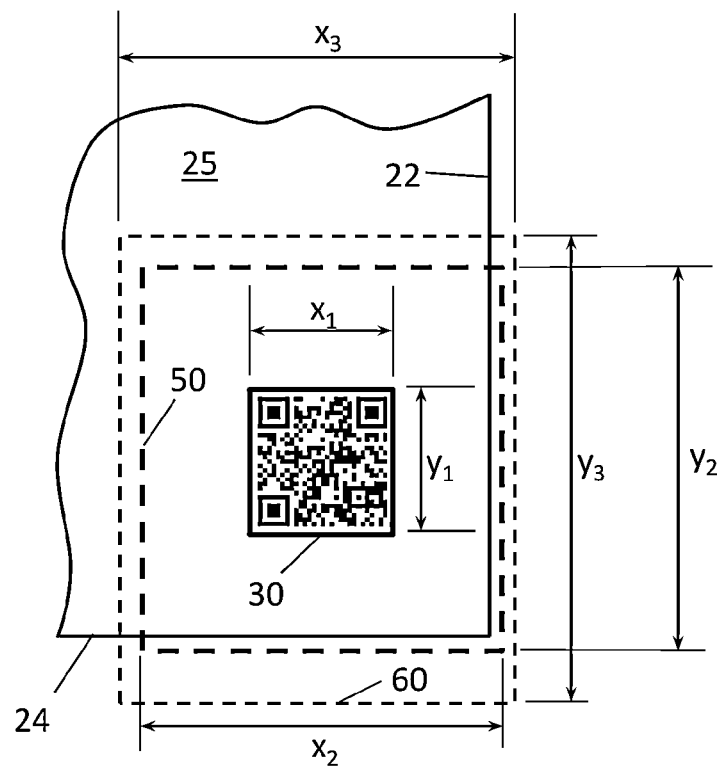
FIG. 10 illustrates an additional configuration of a capture area and a verification area of a labeled consumer good, as applicable to embodiments of verification and authentication methods described herein.
Figure 11:
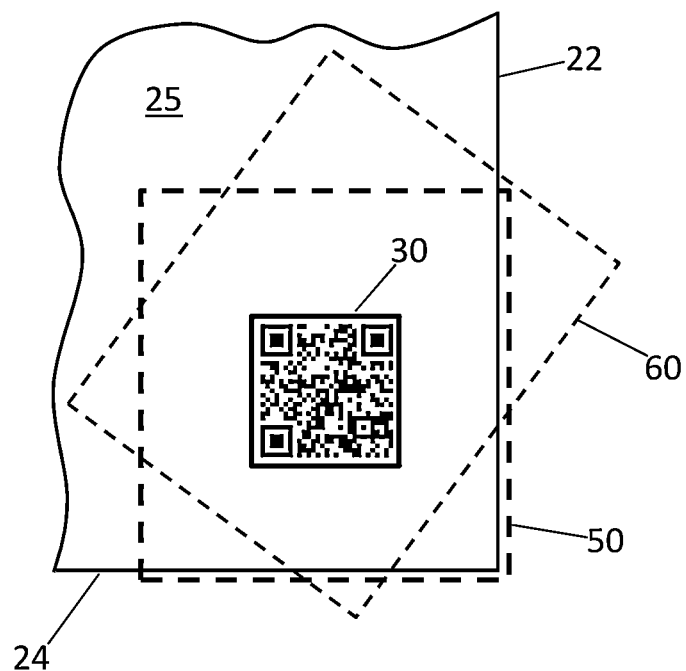
FIG. 11 illustrates an additional configuration of a capture area and a verification area of a labeled consumer good, as applicable to embodiments of verification and authentication methods described herein.
Figure 12:
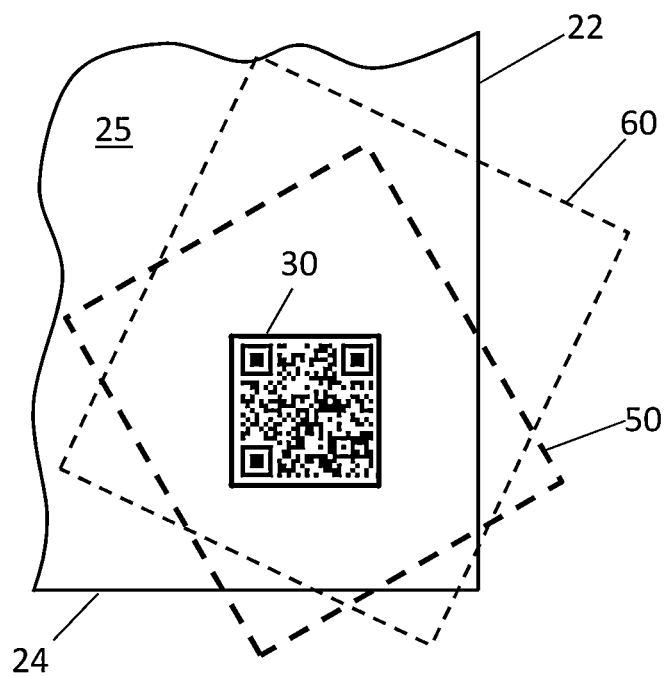
FIG. 12 illustrates an additional configuration of a capture area and a verification area of a labeled consumer good, as applicable to embodiments of verification and authentication methods described herein.

The illustration of FIG. 7 represents when the user of the authentication apparatus 200 has photographed a capture area 60 entirely within the boundaries of the authentication area 50, but the capture area 60 does not include the first edge 22 or the second edge 24 of the package surface 25. The illustration of FIG. 8 represents when the user of the authentication apparatus 200 has photographed a capture area 60 including a portion inside the authentication area 50 and a portion outside the authentication area 50, but the capture area 60 does not include the first edge 22 or the second edge 24 of the package surface 25. The illustration of FIG. 9 represents when the user of the authentication apparatus 200 has photographed a capture area 60 including a portion inside the authentication area 50 and a portion outside the authentication area 50, and the capture area 60 includes the first edge 22 but not the second edge 24 of the package surface 25. The illustration of FIG. 10 represents when the user of the authentication apparatus 200 has photographed a capture area 60 including the entirety of the authentication area 50, a portion outside the authentication area 50, and also both the first edge 22 and the second edge 24. The illustration of FIG. 11 represents when the user of the authentication apparatus 200 has photographed a capture area 60 rotated with respect to the authentication area 50. The illustration of FIG. 12 represents when the user of the authentication apparatus 200 has photographed a capture area 60 rotated with respect to the authentication area 50, and the authentication area 50 itself is rotated with respect to the orientation of the package label 30.

Each of the illustrations of FIGS. 7-12 represents possible outcomes of the images of the authentication area 50 and the capture area 60. In some embodiments, the outcomes may be limited by instructing the user in advance of how the capture area 60 should be photographed. In other embodiments, randomness of the images may be advantageous in that the specific authenticating information may be unknown to would-be counterfeiters attempting to deconstruct the validation methods. But regardless of the outcomes of the photography, such as from the illustrations of any of FIGS. 7-12 or any other conceivable outcome, subsequent validation of the capture area 60 in view of the authentication area 50 proceeds according to the same method, as will now be described.

When the images of both the authentication area 50 and the capture area 60 reside in the processor 230, the processor 230 then determines and evaluates an overlap area, from which validity or invalidity may be decided. As described above, the package label 30 has a known width $x_1$ and a known length $y_1$. The width $x_3$ and the length $y_3$ of the capture area 60 may be determined by a simple proportion from the known width $x_1$ and the known length $y_1$ of the package label 30. The using the width $x_3$ and the length $y_3$ of the capture area 60 and the width $x_1$ and the length $y_1$ of the package label 30, the image of the capture area 60 may be scaled to match the scale of the authentication area 50, which also contains the package label 30. Then, while taking into account the orientation of the package label 30 in both images of the capture area 60 and the authentication area 50, an overlap area may be determined. The overlap area represents an image containing all information that is present in both the capture area 60 and the authentication area 50. The overlap area then may be superimposed onto both the authentication area 50 and the capture area 60 to produce a control image from the authentication area 50 and a comparison image from the capture area 60. Specifically, the control image consists of the image information from the authentication area 50 contained in the overlap area. The comparison image consists of the image information from the capture area 60 contained in the overlap area. Image information outside the overlap area in the capture area 60 may be disregarded, and image information outside the overlap area in the authentication area 50 may also be disregarded.

Once the processor 230 has computed the overlap area and has produced the control image and the comparison image, the processor 230 then calculates a control color profile from the control image and the comparison color profile from the comparison image. As described above, the package surface 25 may include additional indicia such as artwork, solid colors, text, trademarks, logos, or other features unique to a specific brand of consumer good produced by the manufacturer. The additional indicia may be colored. The control color profile and the comparison color profile takes into account that the additional indicia will have expected colors, unique to the manufacturer of the marked consumer good 10. Thus, the product image information and color space comparison use the uniqueness of the additional indicia as a further basis for verification and authentication of the labeled consumer good, also taking advantage of information gained from photography of the package surface 25 beyond the boundaries of the package label 30.

In some embodiments, to produce a color profile from an image, the processor 230 may determine color levels from all pixels of the image, or one-half of all pixels image, or one-fourth of all pixels of the image, for example, and compute an average of all color levels for the entire image. Each pixel of an image may be represented by a color that can be broken down into three components, such as in a red, green, blue (RGB) color space or into four components, such as in a cyan, magenta, yellow, black (CMYK) color space, for example. The RGB values or the CMYK values of all pixels sampled in the image may be averaged to determine a composite color value of the image. The composite color value determined from the control image represents the control color profile. The composite color value from the comparison image represents the comparison color profile. Thus, if the comparison color profile equals the control color profile within an error of ±10%, or ±5%, or ±1%, or ±0.5%, for example, the processor 230 may determine that the labeled consumer good is authentic and may display an appropriate message on the display 270. On the other hand, if the comparison color profile does not equal the control color profile within the error of ±10%, or ±5%, or ±1%, or ±0.5%, the processor 230 may determine that the labeled consumer good is not authentic and may display an appropriate message on the display 270, whereupon the user of the authentication apparatus 200 may proceed with additional confirmations or may take legal steps to seize allegedly counterfeit goods.

Thus, in some embodiments, a comparison of an authentication image of the marked consumer good with a reference image of a known-authentic good of the same kind as the marked consumer good may form an additional basis for determination of authenticity of the marked consumer good. In illustrative embodiments of this kind, comparing the authentication image may include verification that an authenticating feature in the reference image is present in the authentication image. Authenticating features may include a color profile, various colored or uncolored indicia, text (including font type, font size, and color thereof), trademarks, logos, artwork, edge profiles or curvatures of the marked consumer good, dimensions of the consumer good generally or relative to any of these authenticating features, or proximity of the encrypted indicia to any of these authenticating features.

In some embodiments, an added layer of security may be employed using the camera of the verification apparatus before the encrypted indicia are verified or even located. For example, the methods for authenticating the marked consumer good may include photographing the marked consumer good with the camera to form a comparison image of the consumer good. The comparison image may include all or a portion of the marked consumer good, oriented at any angle. The verification apparatus may include reference images of the consumer good, in the product code database, for example, or in a separate reference-image database. In some embodiments, numerous reference images of the consumer good may be stored in the verification apparatus, so that a comparison image of any angle, orientation, or zoom level may be appropriate for an authentication.

Then, once the comparison image is taken, it may be processed by the processor to determine whether the comparison image matches any of the reference images stored in the verification apparatus. If the comparison image does match a reference image, it will be known that the marked consumer good is likely a product of the same type as provided in the reference image, if not authentic. If the comparison image does not match a reference image, this condition may indicate either that the consumer good is not authentic or that another comparison image should be taken from a different orientation, for example. In some embodiments, the match may be assessed based on authenticating features such as color profile, various colored or uncolored indicia, text (including font type, font size, and color thereof), trademarks, logos, artwork, edge profiles or curvatures present in both the comparison image and the reference image. In other embodiments, the match may be assessed based on a particularly relevant authenticating feature such as a brand-name logo that has known proportions and dimensions, whereby strictly comparing the brand-name logo to a logo on the consumer good being verified can give immediate indication that the consumer good may by counterfeit if an exact match is not found.

Once the product is identified as a match, the display of the authentication apparatus may be used to display additional information contained in a product-linked database such as the product code database, for example. The additional information may include a schematic picture of the marked consumer good that indicates a position of the marked consumer good where visible or covert indicia are present. The display may also provide instructions with the schematic picture that inform the person undertaking the verification to perform the authentication scan while ensuring the authentication area of the authentication image includes the position where the indicia are located.

With regard to the illustrative embodiment of the marked consumer good 10 of FIGS. 3A-3C, it should be readily understood that authentication of the marked consumer good 10 via the package label 30 on the package surface 25 as shown in FIG. 3B may be carried out in a manner similar to the authentications described above with reference to FIGS. 5-12. For example, edges of the outer packaging 20 and/or the indicia 29 and/or the brand name 27 may be used as reference points in image comparisons for authentications. Similarly, the article label 80 on the marked article 70 may be placed or oriented in a particular manner on the article surface 75, such that the marked article 70 may be authenticated by only the placement or orientation. As a further illustration, the marked article 70 of FIG. 3B includes a rounded corner 73, which inherently has a curvature and color profile known to the manufacturer, based on the unique identifier assigned to the marked article 70 and encoded in encrypted indicia on the article label 80. As with edges and indicia used to authenticate the marked consumer good 10 by the package label 30 on the outer packaging 20, the curvature and color profile of the article surface 75 or the rounded corner 73 may be used as features that can be authenticated by the photo processing methods described in detail above.

In view of the above-described embodiments of labeled consumer goods and methods for verifying and/or authenticating labeled consumer goods, verification systems for consumer goods and associated methods will now be described. In one embodiment, a verification system may include a consumer good marked with encrypted indicia. The encrypted indicia may include at least one unique identifier, as described above, and at least one piece of authenticating information. The at least one piece of authenticating information may include a geographic coordinates of a valid retail location, a product code, or both. The verification systems may further include a verification apparatus, as described above.

In some embodiments, methods for providing field-verifiable consumer goods may include providing a consumer good and generating for the consumer good a unique serial number. The methods may further include determining a valid retail location at which the consumer good may rightfully and lawfully be intended for sale, then determining precise geographic coordinates of the valid retail location. The methods may further include acquiring a tax serial number from a taxation authority that evidences proper payment of a tax being assessed on the consumer good. The methods may further include combining at least the unique serial number and the precise geographic coordinates into a data string, encrypting the data string, and encoding the encrypted data string into a machine-readable format such as a bar code, a QR-code, or other similar encodation scheme. The methods may further comprise printed the encoded data as encrypted indicia onto a label and affixing the label onto a packaging surface of the consumer good.

In some embodiments, the methods may further comprise determining a known label location for the label on the packaging surface of the consumer good, such that the presence of the label at the precise known location may be used as an indicator of authenticity of the consumer good. The field-verifiable consumer goods provided according to the above-described methods will contain a label, which, when read and decrypted using an authentication apparatus including a GPS receiver, can be verified and authenticated using the unique serial number, the precise geographic coordinates, or any additional information in the encrypted indicia, without the need to establish a connection between the authentication apparatus and a database or other verification means physically separated from the location at which an authentication attempt is being made. In particular, if the consumer good is determined to be located anywhere other than where the label indicates the consumer good is expected to be located, the consumer good may be presumed to be either counterfeit, misdirected in its supply chain, or the result of inappropriate actions of parties such as rogue distributors, for example.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that terms like "preferably," "commonly," and "typically" are not utilized herein to limit the scope of the appended claims or to imply that certain features are critical, essential, or even important to the structure or function of a particular embodiment. Rather, these terms are merely intended to highlight alternative or additional features that may or may not be utilized in a particular embodiment.

It is noted that the term "substantially" is used herein to represent the inherent degree of uncertainty that may be attributed to any quantitative comparison, value, measurement, or other representation. The term "substantially" is used herein also to represent the degree by which a quantitative representation may vary from a stated reference without resulting in a change in the basic function of the subject matter at issue. As such, it is used to represent the inherent degree of uncertainty that may be attributed to any quantitative comparison, value, measurement, or other representation, referring to an arrangement of elements or features that, while in theory would be expected to exhibit exact correspondence or behavior, may in practice embody something slightly less than exact.

It should be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for authenticating a marked consumer good at a final point of sale with a verification apparatus that comprises a processor, a camera, and a location device that communicates to the processor a geographic location of the verification apparatus at a verification time, the method comprising:
identifying the marked consumer good at the final point of sale, the marked consumer good comprising a package label at a label position on a package surface of the marked consumer good, the package label comprising encrypted indicia inside boundaries of the package label, the encrypted indicia comprising geographic coordinates of a permissible destination area for the consumer good, the permissible destination area including a valid retail location, the marked consumer good further comprising outside the boundaries of the package label a brand feature unique to a specific brand of the consumer good, the brand feature having dimensions and a distance from the package label;
verifying the encrypted indicia using the verification apparatus and without connecting to a remote database, wherein the verifying comprises:
  photographing with the camera an authentication portion of the marked consumer good to form an authentication image of the authentication portion that is sent to the processor, the authentication image containing the encrypted indicia and the brand feature;
  decrypting the encrypted indicia contained in the authentication image with the processor to produce decrypted data;
  comparing the geographic location of the verification apparatus at the verification time as determined by the location device with the geographic coordinates of the permissible destination area contained in the decrypted data;
comparing, using the processor and without any connecting to a remote database, the authentication image with a reference image of a known authentic consumer good stored in the processor of the verification apparatus, the reference image containing a reference feature having known dimensions and a reference package label having a known position and a known distance from the reference feature;
verifying, using the processor and without connecting to a remote database, that at least one authenticating feature is present in the authentication image, the at least one authenticating feature chosen from:
  a match of the dimensions of the brand feature in the authentication image with the known dimensions of the reference feature in the reference image;
  a match of the label position of the package label in the authentication image with the known position of the reference package label in the reference image; and
  a match of the distance of the package label from the brand feature in the authentication image with the known distance of the reference package label from the reference feature in the reference image;
determining, using the processor and without connecting to a remote database, whether the final point of sale is at the valid retail location within the permissible destination area based on the comparison of the geographic location of the verification apparatus at the verification time with the geographic coordinates of the permissible destination area contained in the decrypted data; and
determining, using the processor and without connecting to a remote database, an authenticity of the marked consumer good based on at least the determination that the final point of sale is at the valid retail location within the permissible destination area and the verification that the at least one authenticating feature is present in the authentication image.

2. The method of claim 1, wherein the geographic coordinates are GPS coordinates and the location device is a GPS reader.

3. The method of claim 1, wherein:
the encrypted indicia further comprise a unique serial number for the marked consumer good being authenticated;
the verification apparatus further comprises a serial number database containing a list of serial numbers expected to be present on consumer goods at the geographic coordinates of the permissible destination area;
the method further comprises verifying that the unique serial number for the marked consumer good being authenticated matches a serial number on the list contained in the serial number database; and
determining authenticity of the marked consumer good is additionally based on at least the verification that the unique serial number matches a serial number on the list contained in the serial number database.

4. The method of claim 1, wherein:
the encrypted indicia further comprise a product identifier code;
the verification apparatus further comprises a display;
a product code database stored in the processor contains product information linked to the product identifier code; and
the method further comprises:
displaying product information from the product code database on the display based on the product identifier code contained in the encrypted indicia; and
confirming authenticity of the consumer good based on a visual comparison of the displayed product information with physical aspects of the consumer good.

5. The method of claim 1, wherein comparing the authentication image with a reference image comprises:
determining an overlap area of an authentication area of the reference image with a capture area of the authentication image;
scaling the authentication image based on dimensions of features common to both the authentication image and the reference image;
computing a color profile of the overlap area in both the authentication image and the reference image; and
comparing the color profile of the overlap area of the authentication image to the color profile of the reference image.

6. The method of claim 1, wherein the package label is the encrypted indicia covertly printed directly on a package surface of the marked consumer good, whereby the position of the package label is not evident to the user of the verification apparatus until a schematic picture or instructions are displayed on the display, the method further comprising before the verifying of the encrypted indicia:
photographing the marked consumer good with the camera to form a comparison image of the marked consumer good;
comparing the comparison image of the marked consumer good with reference images of known authentic consumer goods stored in the verification apparatus to determine an identity of the consumer good and an expected location of encrypted indicia; and
displaying on a display of the authentication apparatus the expected location of the encrypted indicia with instructions to a user of the verification apparatus to include the location in the authentication portion when the authentication portion is photographed during the verification of the encrypted indicia.

7. The method of claim 1, wherein the brand feature unique to a specific brand of consumer good comprises additional indicia chosen from artwork, solid colors, text, trademarks, brand logos, color profiles, edge profiles, or curvatures.

8. The method of claim 1, wherein verifying that at least one authentication feature is present in the authentication image comprises verification of:
the match of the label position of the package label in the authentication image with the known position of the reference package label in the reference image; and
the match of the distance of the package label from the brand feature in the authentication image with the known distance of the reference label from the reference feature in the reference image; and
the match of the dimensions of the brand feature in the authentication image with the known dimensions of the reference feature in the reference image.

9. A method for providing consumer information to a retailer after purchase of a verified authentic marked consumer good by a customer using an authentication apparatus, the method comprising:
packaging a marked article having an article marking on an article surface of the marked article in a marked package having a package marking on a package surface of the marked package, the package marking comprising encrypted package indicia that enable authentication of the marked consumer good by the authentication apparatus, the authentication apparatus having a location device, a processor, and a camera, without requiring connection of the authentication apparatus to a remote database, the encrypted package indicia comprising a unique serial number of the marked consumer good, a product identifier, and geographic coordinates of a permissible destination area for the marked consumer good, the article marking comprising encrypted article indicia, the encrypted article indicia comprising the unique serial number, the product identifier, and a hyperlink to a manufacturer website that authenticates the marked consumer good from an image of the article marking;
scanning, by the retailer, the package marking to obtain the unique serial number from the package marking when the marked consumer good is sold to the customer;
verifying authenticity of the marked consumer good after the retailer scans the package marking;
uploading, by the retailer, the unique serial number from the scan of the package marking to a manufacturer database;
scanning, by the customer using the camera of the authentication apparatus, the article marking to obtain the encrypted unique serial number from the article marking, decrypting the encrypted unique serial number by the processor, and directing the customer to the manufacturer website to enter registration data to the manufacturer database;
matching the unique serial number from the package marking obtained from the scan of the package marking by the retailer with the unique serial number from the article marking obtained from the scan of the article marking by the customer; and
providing the registration data to the retailer through the manufacturer website.

10. The method of claim 9, wherein authenticity of the marked consumer good is verified by comparing the geographic coordinates in the encrypted package indicia with a location of the retailer when the marked consumer good is sold.

11. A method for authenticating a marked consumer good at a final point of sale with a verification apparatus that comprises a processor, a display, a camera, and a location device that communicates to the processor a geographic location of the verification apparatus at a verification time, the method comprising:

identifying the marked consumer good at the final point of sale, the marked consumer good comprising a package label at a label position on the marked consumer good, the package label comprising encrypted indicia, the encrypted indicia comprising geographic coordinates of a permissible destination area for the consumer good, the permissible destination area including a valid retail location;

photographing the marked consumer good with the camera to form a comparison image of the marked consumer good;

comparing the comparison image of the consumer good with at least one reference image of a known authentic consumer good stored in the verification apparatus to determine an identity of the marked consumer good;

displaying on the display of the authentication apparatus a schematic picture or instructions indicating an expected location for the encrypted indicia of the marked consumer good based on a known location for encrypted indicia on the known authentic consumer good of the at least one reference image;

verifying the encrypted indicia using the verification apparatus and without connection to a remote database, wherein the verifying comprises:

photographing with the camera the location of the marked consumer good indicated by the schematic picture or instructions displayed on the display to capture an authentication image of an authentication portion of the marked consumer good that is sent to the processor, the authentication image containing the encrypted indicia;

decrypting the encrypted indicia contained in the authentication image with the processor to produce decrypted data;

comparing the geographic location of the verification apparatus at the verification time as determined by the location device with the geographic coordinates of the permissible destination area contained in the decrypted data;

determining, using the processor and without connecting to a remote database, whether the final point of sale is at the valid retail location within the permissible destination area based on the comparison of the geographic location of the verification apparatus at the verification time with the geographic coordinates of the permissible destination area contained in the decrypted data; and determining, using the processor and without connecting to a remote database, authenticity of the marked consumer good based on at least the determination that the final point of sale is at the valid retail location within the permissible destination area.

12. The method of claim 11, wherein the package label is the encrypted indicia covertly printed directly on a package surface of the marked consumer good, whereby the position of the package label is not evident to a user of the verification apparatus until the schematic picture or instructions are displayed on the display.

13. The method of claim 11, wherein the package label is the encrypted indicia printed directly on a package surface of the marked consumer good.

14. The method of claim 11, wherein:

the encrypted indicia further comprise a unique serial number for the marked consumer good being authenticated;

the verification apparatus further comprises a serial number database containing a list of serial numbers expected to be present on consumer goods at the geographic coordinates of the permissible destination area;

the method further comprises verifying that the unique serial number for the marked consumer good being authenticated matches a serial number on the list contained in the serial number database; and determining authenticity of the marked consumer good is based on at least the determination that the final point of sale is at the valid retail location within the permissible destination area and the determination that the unique serial number for the marked consumer good matches the serial number on the list contained in the serial number database.

15. The method of claim 11, wherein:

the marked consumer good further comprises a brand feature unique to a specific brand of consumer good outside the package label, the brand feature having dimensions and a distance from the package label;

the comparison image or the authentication image contains the brand feature;

the method further comprises verifying using the processor an authenticity of the brand feature by comparing dimensions of the brand feature in the authentication image with known dimensions of a known authentic brand feature in the reference image; and determining authenticity of the marked consumer good is based on at least the determination that the final point of sale is at the valid retail location within the permissible destination area and the verification of the authenticity of the brand feature.

16. The method of claim 15, further comprising:

comparing, using the processor, the authentication image with the at least one reference image of a known authentic consumer good stored in the processor, the reference image containing a reference feature having known dimensions and a reference package label having a known position and a known distance from the reference feature; and verifying, using the processor, that at least one authenticating feature is present in the authentication image, the at least one authenticating feature chosen from:

a match of the dimensions of the brand feature in the authentication image with the known dimensions of the reference feature in the reference image;

a match of the label position of the package label in the authentication image with the known position of the reference feature in the reference image; and a match of the distance of the package label from the brand feature in the authentication image with the known distance of the reference label from the reference feature in the reference image;

wherein determining the authenticity of the marked consumer good is based on at least the determination that the final point of sale is at the valid retail location within the permissible destination area and the verification that the at least one authenticating feature is present in the reference image.

* * * * *